FIBER-BLENDING APPARATUS

Original Filed April 13, 1953 6 Sheets-Sheet 1

INVENTOR
Kenneth G. Lytton
Charles W. Barnes
Cecil S. Wise

BY Cushman, Darby & Cushman
ATTORNEYS

FIBER-BLENDING APPARATUS
Original Filed April 13, 1953 6 Sheets-Sheet 2
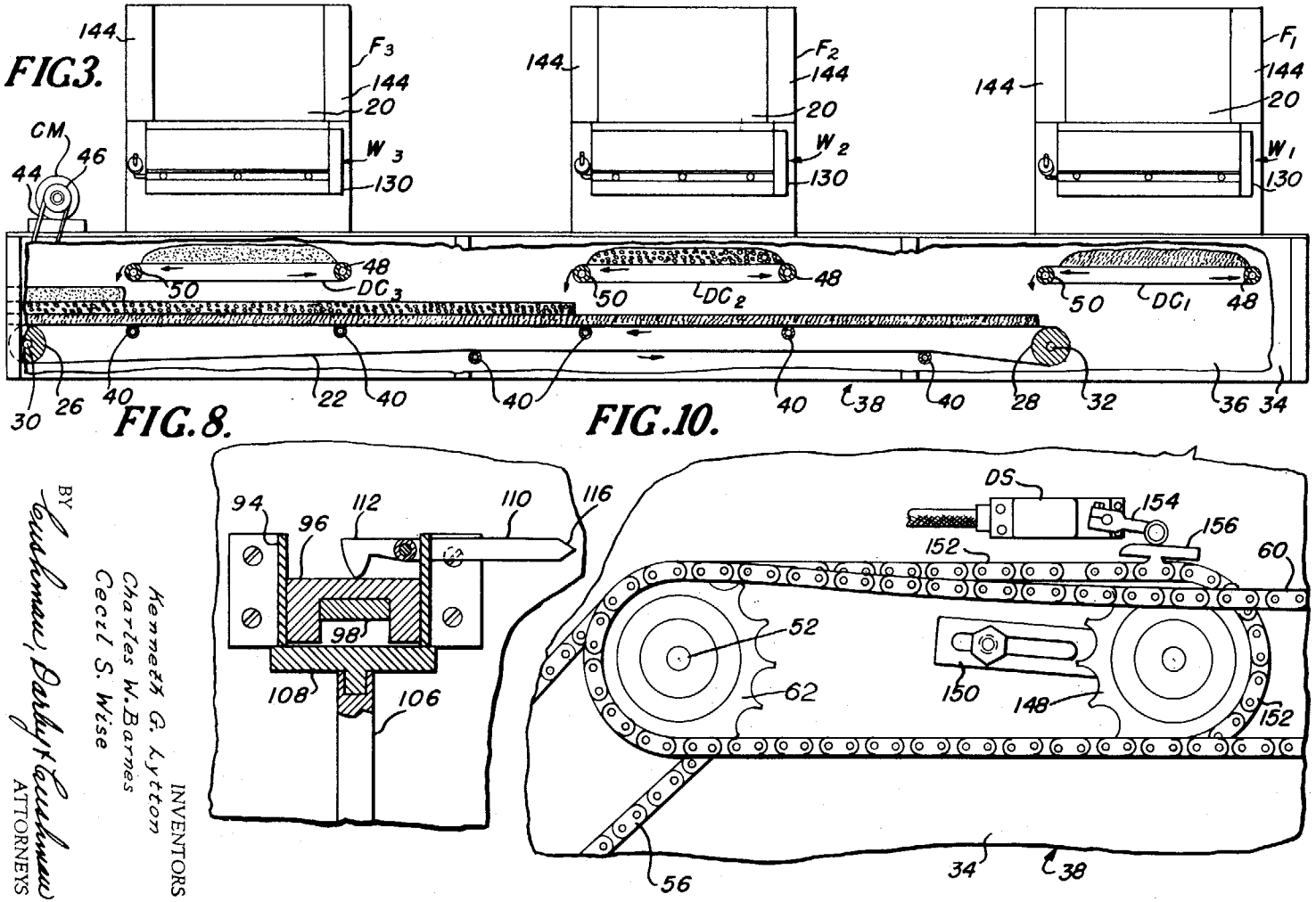
INVENTORS
Kenneth G. Lytton
Charles W. Barnes
Cecil S. Wise
BY Cushman, Darby & Cushman
ATTORNEYS FIBER-BLENDING APPARATUS
Original Filed April 13, 1953 6 Sheets-Sheet 3
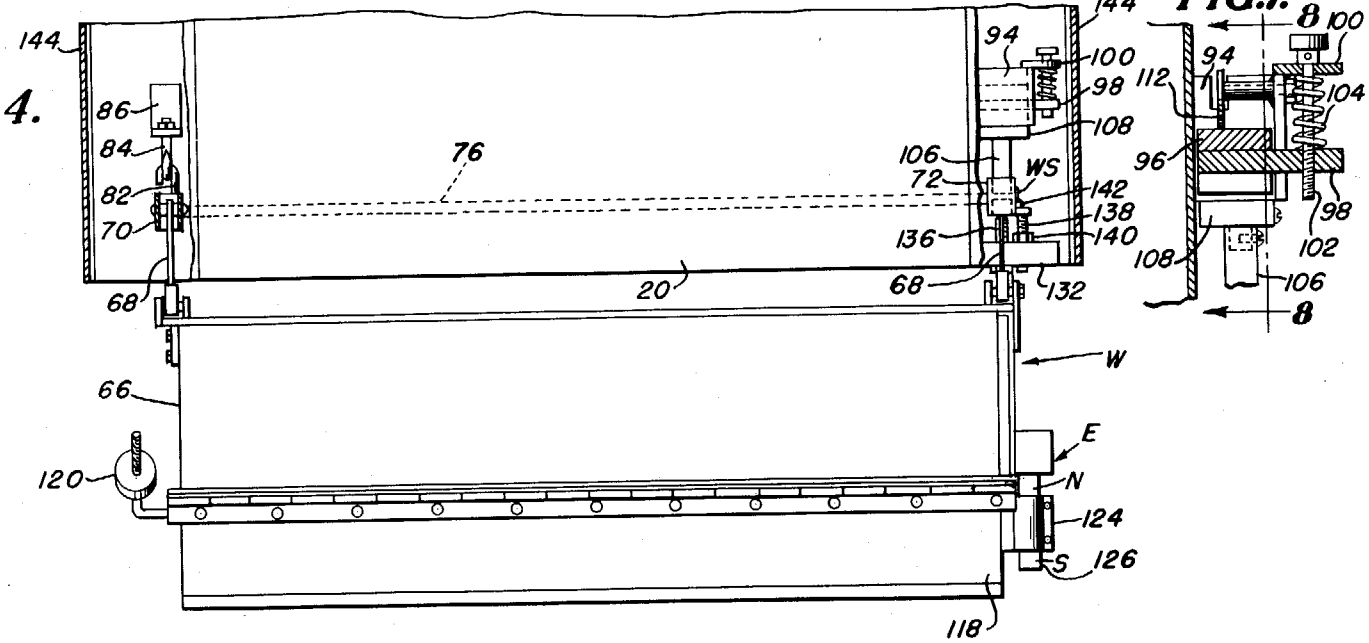
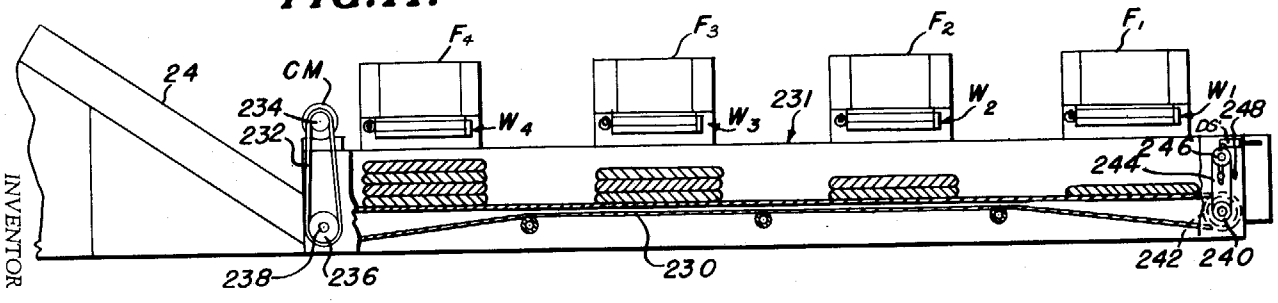
INVENTOR
Kenneth G. Lytton
Charles W. Barnes
Cecil S. Wise
BY Cushman, Darby & Cushman
ATTORNEYS

FIBER-BLENDING APPARATUS

Original Filed April 13, 1953 6 Sheets-Sheet 4

INVENTORS
Kenneth G. Lytton
Charles W. Barnes
Cecil S. Wise
BY Cushman, Darby & Cushman
ATTORNEYS

FIBER-BLENDING APPARATUS

Original Filed April 13, 1953 6 Sheets-Sheet 5

INVENTORS
Kenneth G. Lytton
Charles W. Barnes
Cecil S. Wise
BY Cushman, Darby & Cushman
ATTORNEYS

FIBER-BLENDING APPARATUS

Original Filed April 13, 1953 6 Sheets-Sheet 6

INVENTORS

Kenneth G. Lytton
Charles W. Barnes
Cecil S. Wise

BY Cushman, Darby & Cushman
ATTORNEYS

United States Patent Office

Re. 25,609
Reissued June 30, 1964

25,609
FIBER-BLENDING APPARATUS

Kenneth G. Lytton, Charles W. Barnes, and Cecil S. Wise, Gastonia, N.C., assignors to Fiber Controls Corporation, Gastonia, N.C., a corporation of North Carolina Original No. 3,071,202, dated Jan. 1, 1963, Ser. No. 348,406, Apr. 13, 1953. Application for reissue Nov. 26, 1963, Ser. No. 333,783
46 Claims. (Cl. 177—80)

Matter enclosed in heavy brackets [ ] appears in the original patent but forms no part of this reissue specification; matter printed in italics indicates the additions made by reissue.

This invention relates to a system and apparatus for blending fibers, more especially textile fibers, by weight.

Modern fabrics frequently are made from yarn that is a blend of different types or grades of fibers, for example natural fibers, such as wool and cotton, and synthetic fibers, such as nylon, rayon, acetate, etc. Quite obviously, it is highly desirable to prepare a completely homogenized blend of the different fibers making up any one particular type of yarn in order to achieve complete uniformity of and avoid imperfections in fabric made therefrom. Such thorough blending is not always achieved by known systems and apparatus, which blend fibers by weight, largely because the several different fibers going into the final blend are fed in haphazard batches into a continuously running beater type of mixer or blender.

Further, it obviously is highly desirable for a fiber-blending system and apparatus to have a large capacity, i.e., the ability to blend a large quantity of fibers per unit of time. Fiber-blending apparatus and systems presently in use do not have enough capacity.

Additionally, known apparatus for blending fibers by weight is not always accurate and lacks the ability to maintain the desired blend proportions. Such shortcoming is due to imperfections in the weighing mechanism, which causes a considerable amount of hunting. The result is a blend which varies from specifications.

Therefore, it is an object of this invention to provide an improved fiber-blending system and apparatus that will feed different fibers into a beater blender simultaneously and at uniform rates corresponding to the predetermined proportions of the different fibers desired in the final blend, so that the blender or mixer serves to thoroughly mix and completely homogenize all of the fibers comprising each particular blend produced by a "run" of the apparatus.

It is another object of this invention to provide a fiber-blending system and apparatus which fulfills the above object and also will feed different fibers into a beater blender substantially continuously.

It is another object of this invention to provide an improved fiber-blending apparatus which is accurate and will maintain the exact predetermined desired proportions of the several different fibers making up a selected blend.

It is a further object of this invention to provide an improved fiber-blending apparatus which has a large capacity.

Other objects and advantages of the invention will be evident from the following description and accompanying drawings in which:

FIGURE 3 is an enlarged elevational view, partially in vertical section, of the apparatus shown in FIGURE 2.

FIGURE 4 is an enlarged fragmentary elevational view, with certain cover plates broken away and another removed, of a portion of one of the fiber-feeding machines illustrated in FIGURE 3.

FIGURE 7 is a sectional view taken on line 7—7 of FIGURE 6.

FIGURE 8 is a sectional view taken on line 8—8 of FIGURE 7.

FIGURE 10 is an enlarged detailed fragmentary view of the timing chain shown in FIGURE 2.

FIGURE 11 is a view corresponding to FIGURE 2 and illustrating a modified form of the invention.

THE APPARATUS

Figures 1, 2:
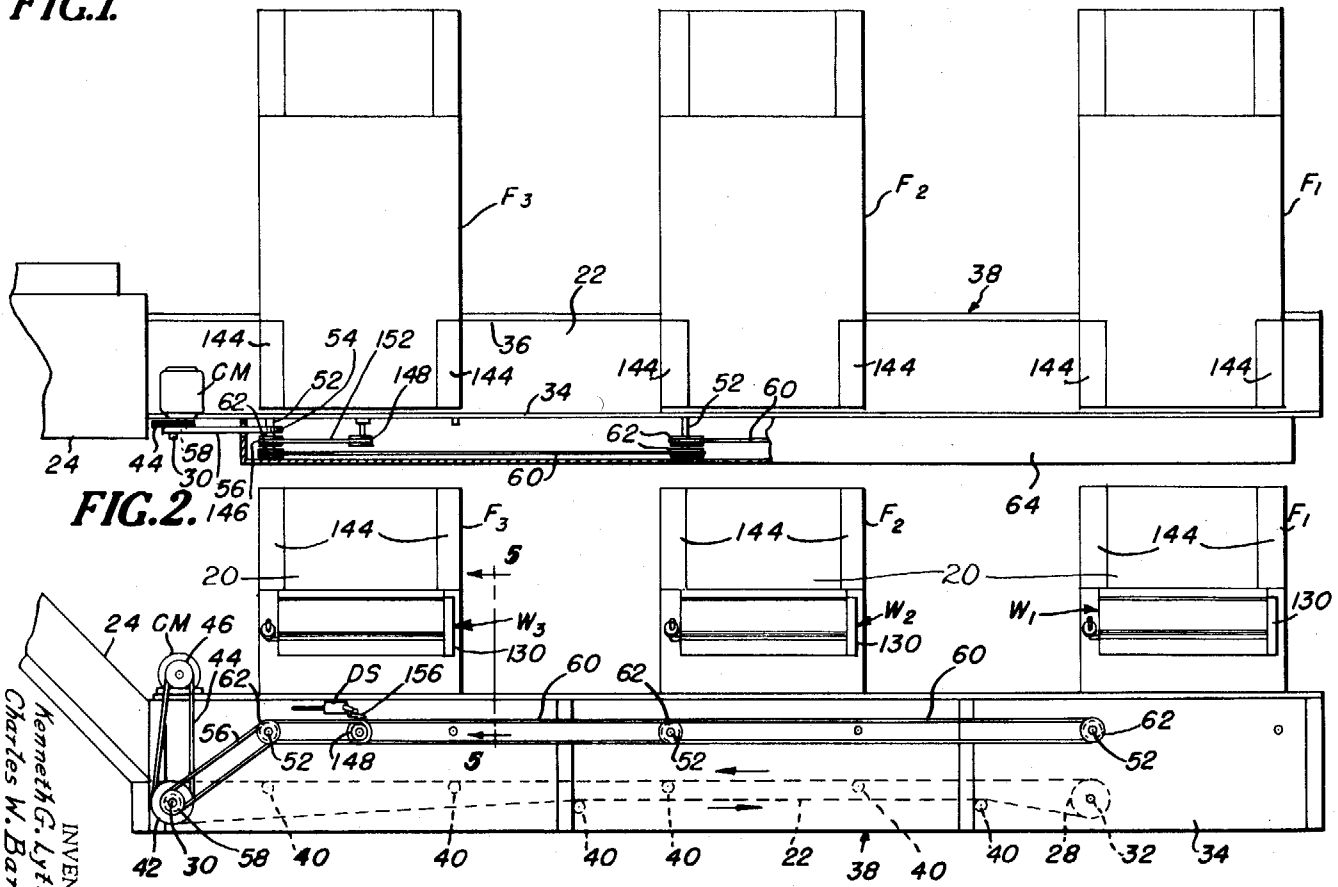
FIGURE 1 is a plan view of a fiber-blending apparatus embodying this invention.
FIGURE 2 is an elevational view of the apparatus shown in FIGURE 1, with the chain drive cover plate removed to show details more clearly.
Figure 5:
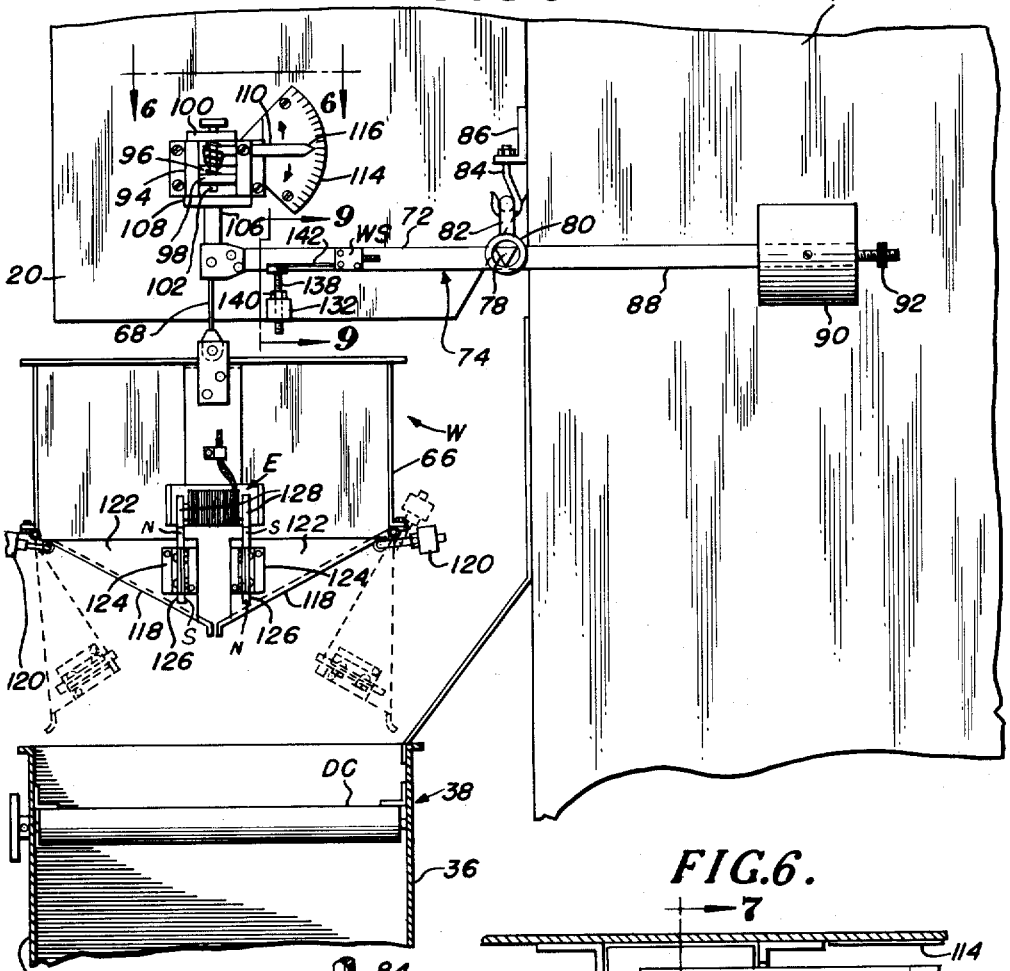
FIGURE 5 is an enlarged fragmentary view taken substantially on line 5—5 of FIGURE 2 and with cover plates being removed to show details.
Figure 6:
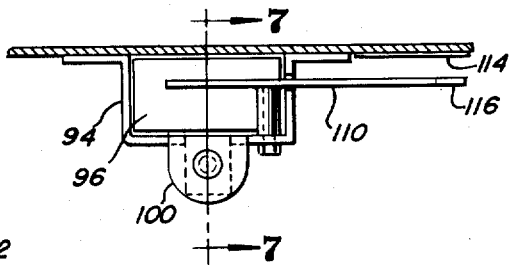
FIGURE 6 is a view taken substantially on line 6—6 of FIGURE 5.

Referring now to the drawings, there is shown in FIGURES 1, 2, and 3 a plurality of equally-spaced like fiber-feeding machines F1, F2, and F3 arranged in a line and each driven by an electric motor (not shown). Although only three such machines F are shown in the drawings, any number can be used, one for each different kind of fiber going into the final blend. Such machines, commonly known as feeders, are well-known in the art, so that no detailed description thereof is necessary. It is sufficient to state that each machine F receives a separate type or grade of fibers going into the blend and contains mechanism for elevating the fibers and discharging the same from a downwardly-facing elevated discharge opening in a discharge portion or spout 20 (FIGURE 5).

Running beneath the discharge spouts 20 of the machines F, for eventual reception and collection of fibers therefrom is a long endless belt conveyor 22 which feeds fibers deposited thereon into the inlet of a conventional continuous beater blender 24, that thoroughly mixes and blends the different fibers fed thereinto. As is also well-known in the art, the beater blender 24 discharges the blended fibers into a tinter (not shown), from whence the blended fibers may be conveyed to a storage bin or a picker (not shown).

The belt of the collecting conveyor 22 is mounted on end rollers 26, 28 having their shafts 30, 32 journalled in the upright side walls 34, 36 of a trough-like housing 38. The conveyor belt is substantially as wide as the housing 38 so that the walls 34, 36 prevent fibers from falling laterally off of the upper flight of the belt. Desirably, similarly journalled intermediate rollers 40 support the upper and lower flights of the conveyor belt between the end rollers 26, 28. The shaft 30 of the end roller 26 at the discharge end of the conveyor 22 projects through the side wall 34 and has a sprocket 42 mounted thereon (FIGURE 2). A drive chain 44 engages the sprocket 42 and a sprocket 46 on the shaft of an electric motor CM mounted on top of the housing 38 for driving the conveyor 22 in the direction indicated by the arrows. Disposed between the side walls 34, 36, above the collecting conveyor 22 and directly beneath the discharge spouts 20 of the feeding machines F, are a plurality of intermediate short equi-length endless belt conveyors DC1, DC2, and DC3, one for each feeder F and each having end rollers 48, 50 that are suitably journalled in the side walls 34, 36 of the housing 38. These intermediate or distributing conveyors are positioned to receive fibers from their corresponding feeders and discharge such fibers onto the collecting conveyor 22.

The rear roller shaft 52 of the distributing conveyor DC3 projects through the side wall 34 of the housing 38 and has a sprocket 54 mounted thereon which is one-half the diameter of the drive sprocket 42 of the collecting conveyor 22. A chain 56 engages the sprocket 54 and another sprocket 58 of equal diameter mounted on the roller shaft 30 of the collecting conveyor 22 to drive the distributing conveyor DC3 in the same direction as and at a linear speed equal to one-half the speed of the collecting conveyor. Chains 60 also engage pairs of sprockets 62, of the same diameter as the sprocket 54, on the rear roller shafts 52 of each pair of adjacent distributing conveyors DC to thereby drive all the distributing conveyors in the same direction, i.e., the direction of movement of the collecting conveyor 22, and at the same speed, which speed is one-half the linear speed of the lower conveyor. Preferably, a removable cover plate 64 (FIGURE 1) encloses the chain drives of the distributing conveyors.

The machines F are so spaced from each other that the distance between the discharge ends of each pair of adjacent distributing conveyors DC is equal to twice the length of each distributing conveyor. Therefore, since the distributing conveyors DC run at one-half the linear speed of the lower collecting conveyor 22, a separate load or batch comprising a predetermined weight of fibers deposited on each distributing conveyor from its corresponding machine F (as will be later described) will be discharged therefrom at the rate which will distribute such load uniformly over that section of the upper flight of the collecting conveyor 22 extending between the discharge ends of each pair of adjacent distributing conveyors. Accordingly, if all such loads of different fibers are deposited simultaneously on each distributing conveyor DC, the result will be a "sandwiching" or stacking effect of the different fibers on the collecting conveyor 22, wherein each separate load or batch thereon substantially coextensively overlies a batch of different fibers previously deposited thereon by the adjacent distributing conveyor, as is best shown in FIGURE 3. Obviously these batches will then be so stacked at the discharge end of the collecting conveyor 22 that all the different fibers will be fed into the heater blender 24 simultaneously and at a uniform rate corresponding to the predetermined proportions of the different fibers desired in the final blend. Thus, the beaters of the blender 24 repeatedly cut through the stack to obtain a completely mixed uniform blend.

Variations in the above-described linear speed ratios of the collecting and distributing conveyors and in the spacing of the distributing conveyors are possible, but the distributing conveyors must be equally spaced and the following relation must obtain:

$$\frac{d}{D}=\frac{v}{V}$$

wherein d equals the length of each of the batches deposited on the distributing conveyors DC, v equals the linear speed of the distributing conveyors DC, D equals the distance along the collecting conveyor between the discharge ends of each pair of adjacent distributing conveyors, and V equals the linear speed of the collecting conveyor 22.

Further, it will be seen that, if the loads of fibers are deposited substantially uniformly over substantially the entire length of their corresponding distributing conveyors and the successive discharge of loads of predetermined weight from the feeders is coordinated with the linear speed of the distributing conveyors so that a succeeding load is discharged from a feeder as the last of the preceding load is discharged from the corresponding distributing conveyor, the sandwiched fibers will be fed into the blender in a substantially uninterrupted and continuous stream, as shown in FIGURE 3. Such a stream achieves more satisfactory operation of the beater blender 24. Apparatus for accomplishing the above-described highly desirable mode of operation will now be described.

Disposed beneath the discharge openings of the fiber-feeding machines F are corresponding weighing mechanisms W1, W2, and W3 for directly receiving fibers from the machines and discharging such fibers in batches of predetermined weight. All these weighing mechanisms W are identical, so a description of one will suffice for all. Each mechanism W (best shown in FIGURES 4 and 5) includes a weigh hopper or pan 66 that is substantially rectangular in plan view and approximately coextensive in length, and preferably also in width, with its corresponding underlying distributing conveyor DC. The pan 66 is suspended, by suitable flexible straps 68 at each end thereof, from the parallel arms 70 and 72 of a yoke-like scale beam 74 which straddles the discharge spout 20 or portion of the corresponding machine F. A cross member 76 connects the two beam arms 70 and 72 behind the spout 20, and these beam arms are provided with projecting knife edge pivots 78 at the opposite ends of the cross member for pivotal support of the beam 74 within a ring portion 80 of links 82. These links 82 depend from vertically adjustable hooks 84 suspended on appropriate brackets 86 on the corresponding fiber-feeding machine F. Extending rearwardly of the knife edge pivots 78 is a counterbalance arm 88 having a large adjustable counterweight 90 thereon and a threaded end on which is mounted a small counterweight 92 in the form of a nut for vernier or fine balance adjustment. For reasons later explained, the counterweights 90 and 92 are adjusted to exactly balance the scale beam 74 when the weigh pan 66 is empty.

Mounted for vertical slidable adjustment in a slideway 94 secured to the side of the fiber-feeding machine F directly above the ends of the beam arm 72 is an inverted U-shaped permanent magnet 96. The magnet 96 is supported by and straddles a horizontal bar 98 which projects outwardly from a vertical slot in the front of the slideway 94 and has a vertical threaded opening in its projecting end. A plate-like member 100 is mounted on top of the slideway 94, overhangs the projecting end of the bar 98, and has an aperture therein aligned with the opening in the bar. A headed screw 102 depends through the aperture in the plate 100 and into threaded engagement with the opening in the bar 98, so that adjustment of the screw serves to raise and lower the permanent magnet 96. Preferably, a coil compression spring 104 (FIGURE 7) is interposed between the plate 100 and the bar 98 in surrounding relation with the screw 102.

Secured to the top of an upstanding post 106 on the end of the beam arm 72 is a metallic plate 108 in position to be attracted and held by the permanent magnet 96. The plate 108 is of a size to abut against the lower edges of the slideway 94, so that in this latter position the force of the magnetic attraction between the magnet and the plate can be varied by vertical adjustment of the magnet by means of the screw 102. Thus, it will be seen that, when the counterweights 90 and 92 are adjusted to substantially exactly balance the scale beam 74 when the hopper 66 is empty and the magnet removed, the permanent magnet 96 may be adjusted thereafter so that a predetermined weight of fibers deposited in the hopper will cause the plate 108, together with the hopper, to drop away from the magnet.

An indicator arm 110 is pivotally mounted on the slideway 94 above the permanent magnet 96 and has a cam-shaped end 112 resting against the upper surface of the latter, whereby the angular position of the arm indicates the relative vertical position of the magnet. Preferably, a scale 114, which may have weight indicia thereon, is secured to the side of the feeder F and cooperates with a pointer 116 on the other end of the arm 110 to provide an indication of the weight of fibers necessary to cause the weigh pan 66 to drop.

The bottom of the hopper 66 is closed by two dumping doors 118 which are hinged to the opposite lower longitudinal edges of the hopper and normally are barely maintained in closed position by adjustable counterbalance weights 120, so that in the absence of doorclosing mechanism (later described) a small weight of fibers in the hopper would open the doors. Each door 118 is provided with end wings or flaps 122 which overlie the corresponding ends of the hopper 66 when the dumping doors are closed. Mounted on both the wings 122 at one end of the hopper 66, as by appropriate bracket 124, are permanent bar magnets 126, which are positioned in substantially parallel relation, but with their poles reversed, as shown best in FIGURE 5. Secured to the same end of the hopper 66, as by appropriate brackets 124, are permaend poles 128 disposed to substantially contact the corresponding poles of the two permanent magnets 126 when the dumping doors 118 are in closed position. Preferably, a cover plate 130 (FIGURES 2 and 3) is mounted on the hopper to enclose the mangets E and 126.

When current flows through the electromagnet E in a direction so that the polarity of its two poles 128 is opposite from the polarity of the adjacent poles of the bar magnets 126, these latter permanent magnets will be strongly attracted to the electromagnet E and, thus, hold the dumping doors 118 in closed position. When, however, current flows through the electromagnet E in the opposite direction, its polarity will be reversed and, thus, strongly repel the permanent magnets 126 so that the dumping doors 118 will be flung wide open. When the doors 118 have been so opened and the fibers in the hopper 66 accordingly discharged onto the distributing conveyor DC, the door counterbalance weights 120 swing the doors back toward closed position, and, if the polarity of the electromagnet E is again reversed, the dumping doors will swing rapidly back to closed position and be strongly maintained in this position by the attraction of the electromagnet.

Figure 9:
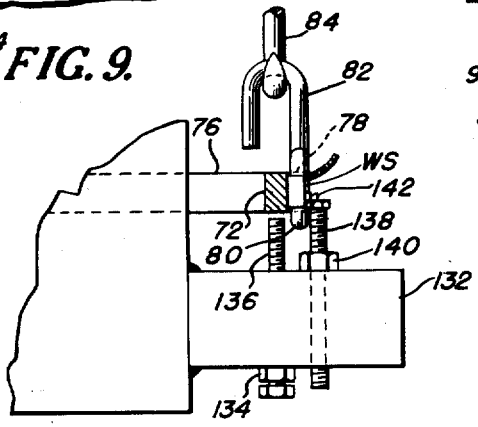
FIGURE 9 is an enlarged detailed fragmentary view taken on line 9—9 of FIGURE 5.

A bar 132 extends laterally from the side of the discharge spout 20 of the feeder F, beneath and adjacent the forward end of the beam arm 72. Threaded upwardly through this bar 132 and having a lock nut 134 thereon is a stop screw 136 (FIGURES 4 and 9) having its upper end disposed a slight distance beneath the beam arm 72. By means of this construction, when a weight of fibers sufficient to pull the plate 108 away from the magnet 96 has been discharged from the feeder F into the hopper 66, the hopper and its supporting scale beam 74 drop only a slight distance before being stopped by engagement of the beam arm 72 with the top of the stop screw 136. Hence, the plate 108 is not removed from the attractive field of the magnet 96. Also threadedly engaged with the lateral bar 132, outwardly of the stop screw 136, is a vertically adjustable screw 138, having a lock nut 140 thereon, for cooperation with a wire actuating arm 142 of a weigh switch WS, preferably a micro-switch, having a set of normally-closed contacts. The switch WS is closed when the scale beam 74 is held in its up position by the permanent magnet 96 and is open when the scale beam drops. Preferably, cover plates 144 (FIGURES 1, 2, 3, and 4) are mounted on the spout 20 to enclose the scale beam 74, the magnet 96 and its slideway 94, and the lateral bar 132.

Referring to FIGURE 1 of the drawings, it will be seen that a third sprocket 146, of the same diameter as the sprockets 54 and 62, is mounted on the roller shaft 52 of the distributing conveyor DC3. Engaged with the sprocket 146 and running over a sprocket 148 journalled on a bracket 150 adjustably mounted on the side of the housing 38 is a timing chain 152, which is exactly half the length of the endless belts of the distributing conveyors DC. A timing or dump switch DS having a set of normally-open contacts and a set of normally-closed contacts is secured to the side of the housing 38 and is provided with a pivoted actuating arm 154 positioned to be engaged by a single lug 156 on the chain, as best shown in FIGURE 10. By reason of this construction, it will be seen that the switch DS will be actuated twice during each complete cycle of the distributing conveyors DC, i.e., actuated each time the distributing conveyors travel a distance equal to their length. The reason for this construction will be described more in detail hereinafter.

THE ELECTRIC CONTROLS

Figure 12:
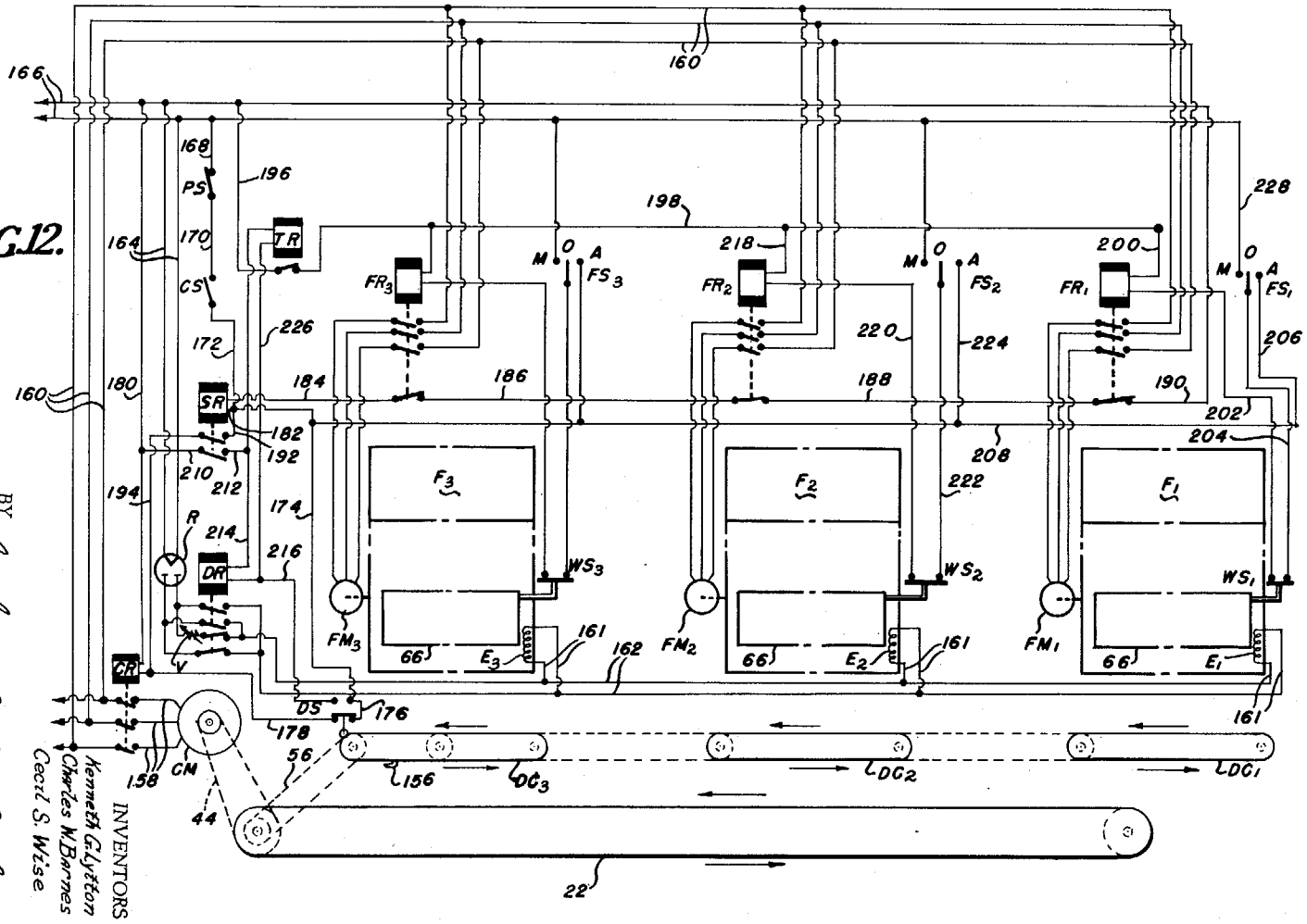
FIGURE 12 is a wiring diagram of the electrical control system for apparatus embodying this invention.

A description of the operation of the afore-described fiber-blending apparatus may best be understood by reference to FIGURE 12 of the drawings. The electric motor CM which drives both the collecting and distributing conveyors 22 and DC preferably is of three-phase type and provided with power from three conductors 158 that are connected to any suitable source of power, e.g., 550 v. 3-phase. The motor CM is controlled by a relay CR having three sets of normally-open contacts connected in series with the conductors 158. Preferably, the conveyor motor CM is provided with a conventional electromagnetic brake (not shown) that is automatically released when the motor is energized and automatically set when the motor is deenergized. The electric motors FM1, FM2, and FM3 which drive the feeders F are likewise of three-phase type and provided with automatic brakes (not shown) like the auotomatic brake of the conveyor motor CM. The feeder motors FM are connected to the same three-phase power source as the conveyor motor CM, by conductors 160, and are controlled individually by feeder motor relays FR1, FR2, and FR3, each having three sets of normally-open contacts connected in series with the conductors 160 and one set of normally-closed contacts. These sets of normally-closed contacts are all connected in series in a circuit for reasons later explained.

The dumping-door-controlling electromagnets E of each feeder F are connected in parallel with conductors 162 (by suitable flexible conductors) for simultaneous operation and are supplied with direct current from a rectifier R. The rectifier is supplied with power, via conductors 164, from two conductors 166 that are connected to an appropriate source of power, e.g., 110 v. single-phase A.C. The conductors 166 also supply power to the energizing coils of all the various relays of the electrical control system.

In order to control the direction of current flow through the electromagnets E, there is provided a current-reversing or dumping relay DR, having two sets of normally-open and two sets of normally-closed contacts appropriately connected between the rectifier R and the conductors 162. Preferably, a variable resistance V is connected in series between the rectifier R and one of the sets of contacts of the relay DR in order to provide a differential between the "door-opening" and "door-closing" forces exerted by the electromagnets E. The control system also includes a safety relay SR having two sets of normally-open contacts, and a time-delay relay TR having a set of normally-closed contacts. The time-delay relay TR is of the delayed-closing type and is adjusted to obtain about three to five seconds' delay in the closing of its contacts after de-energization of its energizing coil. As described above, the control system also includes the timing or dump switch DS that is operated by the lug 156 on the timing chain 152 and has a set of normally-open contacts and a set of normally-closed contacts. Also as previously described, weigh switches WS1, WS2, and WS3 are associated with the weighing mechanisms W and each has one set of normally-closed contacts that are opened by descent of the corresponding weigh pan 66 upon its receipt of a predetermined weight of fibers.

The feeders are each separately controlled by manually-operable single-pole double-throw switches FS1, FS2, and FS3, each having three positions: manual, off, and automatic. Further, the control system may include a picker demand limit switch PS having a set of normally-closed contacts. This switch PS may be associated with a supply bin or hopper (not shown) for a picker, and is adapted to be opened when such bin is full, so that the entire apparatus will be shut down and no fibers will be supplied to the picker supply bin. When, however, the supply bin is not full, the picker demand limit switch PS is closed and the apparatus will run and supply fibers to the picker. The switch PS can also be associated with a conduit for pneumatically conveying fibers to a picker and achieve the same result, the switch being adapted to be open when air is carrying fibers through the conduit and to be closed when no air is flowing through the conduit. The controls also include a single-pole single-throw manually-operable conveyor switch CS connected in series with the picker demand limit switch PS for manually stopping the operation of the conveyor motor CM.

OPERATION

Assuming that all three of the feeders F are shut off and that the picker is calling for fibers so that the picker demand limit switch PS is closed, the first step is to close the conveyor switch CS which closes a conveyor-motor-actuating circuit, via conductor 168, switch PS, conductor 170, switch CS, conductors 172, 174, and 176, the normally-closed contacts of the dump switch DS, conductor 178, the coil of the relay CR, and the conductor 180. This circuit, when closed, energizes the conveyor relay CR and thereby closes its contacts to start the motor CM to drive the conveyors. It also will be noted that closing the conveyor switch CS also closes a safety-relay-energizing circuit via conductor 168, switch PS, conductor 170, switch CS, conductors 172 and 182, coil of relay SR, conductor 184, normally-closed contacts of relay FR3, conductor 186, normally-closed contacts of relay FR2, conductor 188, normally-closed contacts of relay FR1, and conductor 190. When this circuit is so closed, the relay SR is energized and both sets of its contacts closed to also close an alternating conveyor-motor-actuating circuit via conductor 168, switch PS, conductor 170, switch CS, conductors 172 and 192, a set of the normally-open contacts of relay SR, conductors 194 and 178, coil of relay CR, and conductor 180.

The control switch FS1 for feeder F1 is then moved to automatic position A to thereby close an actuating circuit for feeder motor FM1, via conductor 196, the normally-closed contacts of the time-delay relay TR, conductors 198 and 200, coil of relay FR1, conductor 202, weight switch WS1, conductor 204, switch FS1, conductors 206, 208, 174, and 172, switch CS, conductor 170, switch PS, and conductor 168. When this circuit is closed, the feeder motor relay FR1 is energized to close its three sets of normally-open contacts and thereby start the motor FM1 for the fiber-feeding machine F1. It will be noted that, when any of the relays FR are energized, its set of normally-closed contacts is open to thereby interrupt the aforedescribed safety-relay-energizing circuit and thus also interrupt the alternative conveyor-motor-actuating circuit. The feeder F1 then delivers fibers to its weight pan 66, and, when a predetermined weight of fibers has been received therein, the weight pan drops, thus opening the contacts of the weight switch WS1 to open the aforedescribed feeder-motor-actuating circuit and de-energize the relay FR1 to stop the motor FM1 and the feeding of further fibers into the weight pan. Since all of the relays FR are then de-energized, the safety-relay-energizing circuit is again closed, so that the alternative conveyor-actuating circuit is also closed.

When the lug 156 on the timing chain 152 actuates the dump switch DS, a dump-relay energizing circuit is closed, via conductors 180 and 210, a set of contacts of the safety relay SR, conductors 212 and 214, coil of relay DR, conductor 216, the normally-open but now closed contacts of switch DS, conductors 174 and 172, switch CS, conductor 170, switch PS, and conductor 168. Thus, the dump relay DR is energized and reverses the direction of current flowing through the electromagnet E1 (and also the electromagnets E2 and E3) and dumps the fibers contained in the weigh pan of feeder F1 onto the distributing conveyor DC1, from whence the fibers are discharged onto the collecting conveyor 22. Thereupon, the weight pan 66 rises and is held in its uppermost position by the attraction of the plate 108 by the permanent magnet 96. At the same time, the rising of the weight pan closes weight switch WS1 to again close the feeder-motor-actuating circuit which starts operation of the motor FM1 to discharge fibers into the weigh pan and at the same time interrupts the safety-relay-energizing circuit.

It will be noted that, when the dump switch DS is actuated by the lug 156, the conveyor-motor-actuating circuit is interrupted, but, if the safety-relay energizing circuit is closed, the alternative conveyor-motor actuating circuit is also closed so that all the conveyors continue to run. In the event, however, that the weigh pan 66 has not received its predetermined weight of fibers when the lug on the timing chain actuates the dump switch DS, the relay FR1 is still energized and holds open its normally-closed set of contacts. Accordingly, the safety-relay-energizing circuit is open, and, thus the alternative conveyor-motor-actuating circuit is open, as well as the dump-relay energizing circuit. Hence, the conveyors stop and the weigh pan 66 will not be dumped until the latter receives its predetermined weight of fibers and drops to open the contacts of the weigh switch WS to thereby interrupt the feeder-motor-actuating circuit and close the safety-relay-energizing circuit.

After the feeder F1 has been started in accordance with the foregoing description and has dumped a load of fibers on the distributing conveyor DC1, the machine F2 is started by moving the switch FS2 to automatic position A, to thus complete an actuating circuit for the feeder motor FM2, which energizes relay FR2 via conductor 196, contacts of relay TR, conductors 198 and 218, coil of relay FR2, conductor 220, weigh switch WS2, conductor 222, feeder switch FS2, conductors 224, 208, 174, and 172, switch CS, conductor 170, switch PS and conductor 168. Hence, the motor FM2 starts and the feeder F2 discharges fibers into its weigh pan 66. In the event that the weigh pan of either or both feeders F1 and F2 does not fill up with its predetermined weight of fibers prior to the time that the timing lug 156 again actuates the dump switch DS, the normally-closed contacts of either or both of feeder motor relays FR1 and FR2 will be open to thus interrupt the safety-relay-energizing circuit, so that the conveyors will be brought to a halt, as above described. Again, when the weigh pans of both feeders F1 and F2 have received their predetermined weights of fibers and have dropped to thereby open the switches WS1 and WS2, the relays FR1 and FR2 will be de-energized to stop the further feeding of fibers from the feeders, and, when the last feeder to discharge its quota stops, the safety relay SR will be energized to thereby simultaneously discharge fibers from the weigh pans of both feeders F1 and F2 onto their corresponding distributing conveyors DC1 and DC2, at the same time or rather shortly thereafter, as later described, the conveyor-motor-actuating circuit is closed to start the operation of all of the conveyors.

The remaining fiber-feeding machine F3 is started in the same manner after the fiber-feeding machine F2 has dumped its initial load of fibers on the distributing conveyor DC2, so that by the successive starting of all of the fiber-feeding machines F1, F2, and F3 the initially discharged loads of fibers of all the feeders arrive at the discharge end of the collecting conveyor 22 in the desired stacked or sandwiched arrangement shown in FIGURE 3. Thereafter the feeders will continue to recycle, so that the different fibers will be fed into the beater blender in a sandwiched continuous stream. At the end of a run, the feeders are stopped in the same sequence by moving their respective switches FS to off position O, so that no batches are fed separately into the beater blender 24 without being stacked or sandwiched with corresponding batches from all the other feeders.

It will be seen that the energizing coil of the time-delay relay TR is connected in parallel with the energizing coil of the dump relay DR by conductors 214 and 226, so that whenever the later relay is energized, the relay TR is also energized. Thus, after the weigh pans of the several feeders F have discharged their batches or loads of fibers on the distributing conveyors DC and rise to close the weigh switches WS, the feeder-motor-actuating circuits will not be closed until a few seconds after the de-energization of the dump relay DR and the time-delay relay TR. Accordingly, because of this delay in the reenergization of the feeder motor relays FR, there is sufficient time for the dumping doors to close and be held shut and for all the weigh pans to rise and to be securely held in their up position by their respective permanent magnets 96 before the feeder motors FM start. There is thus avoided any possibility of false starts of the motors FM by premature closing of the weigh switches WS before their corresponding weigh pans are firmly held in their up position by the permanent magnets before all the dumping doors are closed. Hence, hunting of the weighing mechanisms W cannot occur.

After all of the feeders F have been started as outlined above, the sandwiched batches of fibers will be fed in a continuous and uninterrupted stream into the beater blender at a rate which is limited only by the particular feeder F which requires the longest interval of time to fill and dump its weigh pan. Hence, for maximum capacity the linear speed of the conveyors 22 and D.C. should be regulated so that the distributing conveyors will travel a distance only slightly less than one-half of their cycle during the aforedescribed limiting time interval. The reason for this slight discrepancy in distance travelled is to avoid any pausing of the conveyors; as outlined above, during each cycle of operation of the feeders F and to keep the conveyors running continuously for smoother operation of the apparatus.

In the event that it is desired to test the weighing mechanisms of the machines individually without operation of the conveyors, the conveyor switch CS is opened and the control switch FS of the feeder which is desired to be tested, for example, feeder F1, is moved to its manual position M, while the switches of the other feeders are moved to off position O. In this position of the switch FS1, an alternative feeder-motor-actuating circuit will be closed, via conductor 228, switch FS1, conductor 204, weigh switch WS1, conductor 202, coil of relay FR1, conductors 200 and 198, controls of time-delay relay TR, and the conductor 196, to thus energize the feeder motor relay FR1 and start the feeder motor FM1. Thereupon, the machine F1 will run and discharge a predetermined and adjustable quantity of fibers into its corresponding weigh pan, and, upon opening of the weigh switch WS1 upon descent of the pan, the feeder F1 will stop. The fibers will not be dumped, however, unless the conveyor switch CS is closed to cause the dump switch DS to be actuated by the timing lug 156 to close the energizing circuit for the dump control relay DR. This manual position M of the feeder switches FS of the machines F is obviously used only for the purpose of enabling various quantities of fibers to be discharged into the weigh pans prior to a run in order to accurately adjust the permanent magnets for a predetermined weight setting.

MODIFICATION OF THE APPARATUS

Referring now to FIGURE 11 of the drawings, there is shown therein apparatus which serves to feed different fibers into a beater blender 24 simultaneously and at uniform rates corresponding to the predetermined proportions of the different fibers desired in the final blend, but which does not feed such fibers in a continuous and uninterrupted stream. In this embodiment, there are provided a plurality of equally spaced fiber-feeding machines, four such machines, F1, F2, F3, and F4, being shown in the drawings, each identical with and having exactly the same type of weighing mechanism W as has been heretofore described. There are no intermediate or distributing conveyors, but instead of feeders F dump their equi-length batches simultaneously and in spaced relation directly onto a collecting conveyor 230 disposed in a housing 231, similar to the housing 38 previously described. This conveyor 230 is driven, as in the previously described embodiment, by an electric motor CM having a chain 232 engaged with a sprocket 234 on the motor shaft and with a sprocket 236 on the shaft 238 of the roller at the discharge end of the collecting conveyor. As before, the fiber-feeding machines F are equally spaced along the conveyor 230 and controlled by a system of electrical controls identical to those shown in FIGURE 12.

A sprocket 240 of a diameter equal to one-half that of the front conveyor roller 242 is mounted on the front roller shaft of the conveyor 230 and has a timing chain 244 engaged therewith, which runs over another sprocket 246 journalled on a bracket adjustably mounted on the side wall of the housing 231. A dump switch DS′ for the electrical controls, and which is identical in construction with the dump switch DS, is secured to the side of the housing 231 and has its actuating arm positioned to be engaged by a single lug 248 on the chain 244. The chain 244 is of a length equal to one-half the distance between corresponding ends of adjacent spaced batches of fibers deposited on the collecting conveyor 230; i.e., the chain length is equal to one-half a distance equal to the length of a batch plus the distance between adjacent batches. Because of the relative diameters of the sprocket 240 and the roller 242, it will be seen that the chain runs at a speed equal to one-half of the linear speed of the collecting conveyor.

Hence, since the batches of fibers are dumped simultaneously on the conveyor, the latter travels a distance equal to the distance between corresponding ends of spaced adjacent batches before a succeeding batch is dumped, so that each batch of fibers deposited on the collecting conveyor substantially coextensively overlies the batch previously deposited thereon by the adjacent fiber-feeding machine. It will again be seen that the relation of $$\frac{d}{D}=\frac{v}{V}$$

obtains, wherein $d$ equal the length of the timing chain (or the distance between equally-spaced switch-tripping lugs thereon), $v$ equals the linear speed of the timing chain instead of the linear speed of distributing conveyors, D equals the distance between corresponding ends of spaced batches deposited on the collecting conveyor, and V equals the linear speed of the collecting conveyor.

In this embodiment, it will be seen that the batches are stacked on the collecting conveyor 230 and fed in separate groups into the beater blender, which again makes for a thoroughly mixed and homogenized final blend.

By a very simple change in the length of the timing chain 244 (or by mounting more than one switch-tripping lug 248 thereon) and by properly spacing the feeders F, the apparatus shown in FIGURE 11 can be adapted to feed fibers in a substantially continuous and uninterrupted stream. Thus, it will be seen that if the feeders F are spaced apart a distance so that the spacing between their respective weigh pans is substantially equal to multiples of the lengths of the dumped batches or loads of fibers, and the dump switch DS′ is periodically actuated after the collecting conveyor 230 has moved a distance equal to the length of a batch of fibers deposited thereon, the result will be the feeding of a substantially continuous and uninterrupted stream of fibers into the beater blender 24. Thus, for example, if the feeders F shown in FIGURE 11 are spaced so that the distance between their weigh pans is substantially equal to the length of a load of fibers deposited on the conveyor 230, two equally-spaced lugs 248 may be mounted on the chain 244 (or a single lug 248 may be used with a chain which is one-half of the length of chain 244), so that after the conveyor 230 has travelled a distance equal to the length of a batch of fibers thereon, the dump switch DS' will again be actuated. Hence the ends of the fiber loads dumped from any one feeder F will be substantially contiguous. In this modification, after the feeder F1 has been started the feeder F2 is not started until the feeder F1 has dumped two loads on the collecting conveyor 230, and the feeder F3 is not started until after the feeder F2 has dumped two loads on the collecting conveyor 230, etc.

The result of this construction is to fill up the blank spaces between the loads shown in FIGURE 11, so that there is a constant and uninterrupted stream of sandwiched fibers being fed into the beater blender 24.

MODIFICATION OF THE ELECTRICAL CONTROLS

Figure 13:
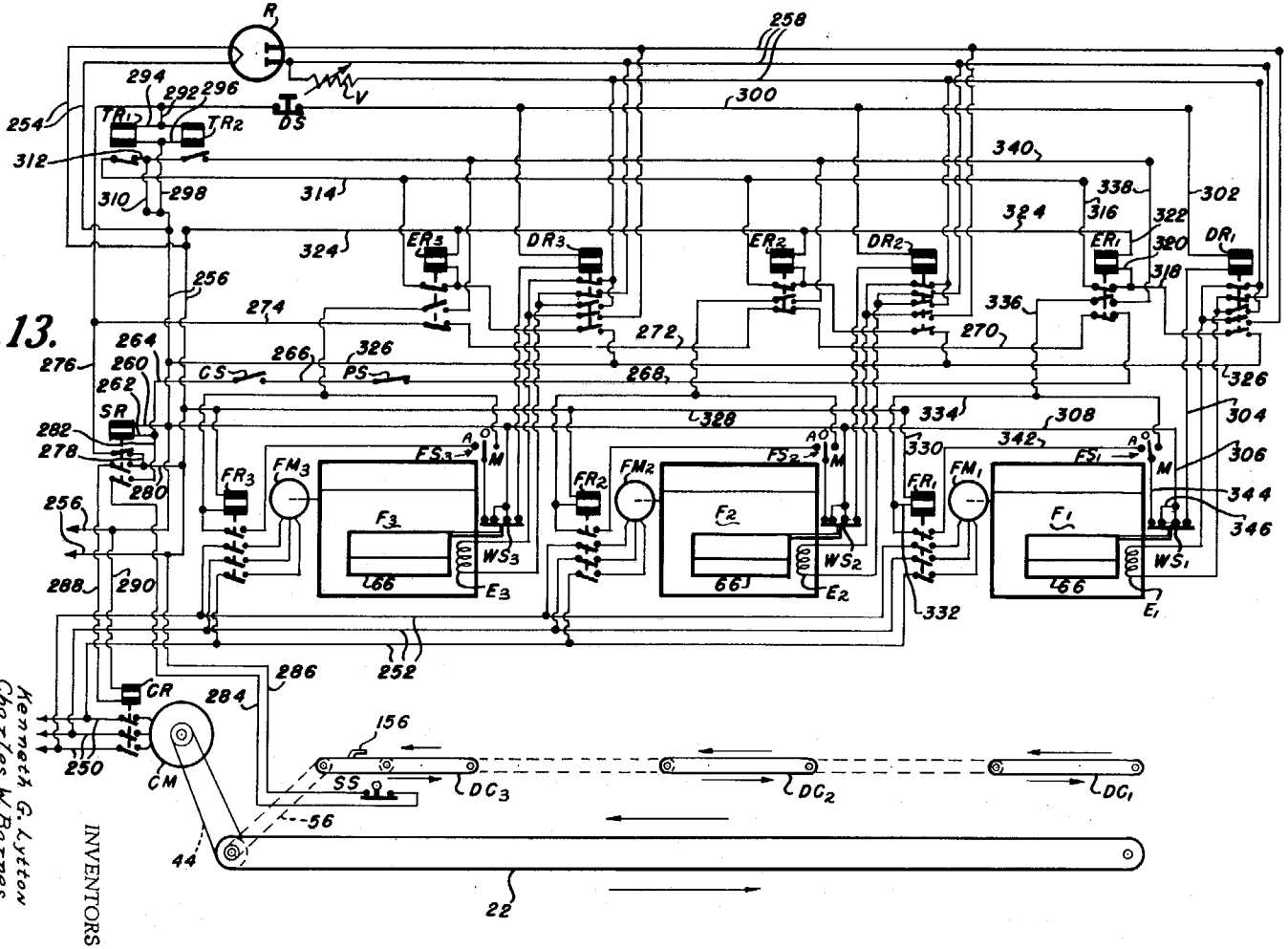
FIGURE 13 is a wiring diagram of another type of electrical control system for apparatus embodying this invention.

Referring now to FIGURE 13 of the drawings, there is shown a wiring diagram which can be used to operate any of the aforedescribed apparatus embodiments and achieve substantially the same results as the aforedescribed control system, although the cylic operation of the apparatus will proceed on a somewhat different principle. In this system of operation, the collecting conveyor 22, and also the distributing conveyors DC if used, pause while the several feeders F run, fill their weigh pans, stop, and dump independently of each other. When the last of the feeders to receive its quota has stopped and dumped its load or batch of fibers independently of the other feeders, the feeders remain stopped while the conveyors start. After the conveyors have run a predetermined distance, corresponding to the distance necessary to achieve the aforedescribed stacking or sandwiching of the batches from the several feeders on the collecting conveyor, the conveyors again pause while the feeders again run, stop, and dump their batches of fibers independently.

The electrical apparatus for achieving this system of operation again includes three conductors 250 for providing three-phase power to the conveyor motor CM, which is controlled by a conveyor motor relay CR. The feeders F1, F2, and F3 are operated by corresponding feeders motor FM1, FM2, and FM3, that are controlled by corresponding feeder motor relays FR1, FR2, and FR3, each having four sets of normally-open contacts. The feeder motors FM are supplied with power by three conductors 252 that are connected to the conductors 250 in advance of the contacts of the relay CR. Again, all of the motors CM and FM preferably are provided with conventional electromagnetic brakes, the same as described with reference to FIGURE 12. The dumping-door-controlling electromagnets E1, E2, and E3 of the feeders F are supplied with direct current from a rectifier R, which, in turn is supplied with power, via conductors 254, from two conductors 256 that are connected to an appropriate source of power; e.g., 110 v. single-phase A.C. These two conductors 256 also supply power to the energizing coils of all of the various control relays.

The direction of current flow through each electromagnet E is controlled independently of the others, however, by separate dumping relays DR1, DR2, and DR3, one for each feeder F, and each having three sets of normally-closed and two sets of normally-open contacts. The two sets of normally-open contacts and two of the three sets of normally-closed contacts of the relays DR are appropriately connected between the rectifier R and the corresponding electromagnets E by the conductors 258 for reversing current flow through the electromagnets by operation of the relays. Again, a variable resistance V is connected in series with one of the conductors 258, so that a differential may be achieved, if desired, between the "holding" and "repelling" forces of the electromagnets with respect to the dumping doors of the weigh pans 66.

The control system for the feeders F also includes the weigh switches WS1, WS2, and WS3, one for each feeder, and each having two sets of normally-closed contacts; i.e., closed when the corresponding weigh pan is in its elevated or raised position. The feeders also have corresponding energizing relays ER1, ER2, and ER3, each having two sets of normally-open and one set of normally-closed contacts, and the corresponding manually-operable, single-pole, double-throw switches FS1, FS2, and FS3, each having three positions—automatic A, off O, and manual M. The control system also includes two time-delay relays TR1 and TR2, relay TR1 having a set of normally-open contacts, and relay TR2 having a set of normally-closed contacts. The relay TR1 delays in both opening and closing its contacts, while the relay TR2 delays only in opening its contacts. A safety relay SR having a set of normally-closed and two sets of normally-open contacts is also provided. Further, the control system includes a timing or conveyor stop switch SS having a set of normally-closed contacts and provided with an actuating element that is adapted to be engaged by the lug 156 on the timing chain 152 for opening the switch.

The system may also include a picker demand limit switch PS, which has a set of normally-closed contacts and performs the same functions and operates in the same manner as the picker demand limit switch described above with reference to FIGURE 12. Again, connected in series with the picker demand limit switch PS is a manually-operable conveyor switch CS. In addition to the foregoing controls, the system may include a manually-operable dump switch DS of the push button type having a set of normally-closed contacts. The functions of this switch will be described more in detail hereinafter.

OPERATION WITH MODIFIED ELECTRICAL CONTROLS

Assuming that all three of the feeders F are shut off, i.e., the switches FS are all in off O position, and that the picker is calling for fibers so that the picker demand limit switch PS is closed, the first step is to move the switch FS1 for the feeder F1 to automatic A position and to close the conveyor switch CS. This latter switch closes a safety-relay-energizing circuit, via conductor 260, coil of relay SR, conductors 262 and 264, switch CS, conductor 266, switch PS, conductor 268, a set of now closed but normally-open contacts of relay ER1, conductor 270, a set of normally-open but now closed contacts of relay [cuit] *circuit*, via conductor 280, a set of normally-open but now closed contacts of relay ER3, conductor 274, conductor 276, the set of normally-closed contacts of relay SR, conductor 278, and conductor 280. It will be noted that this circuit is self-interrupting because of the inclusion of the set of normally-closed contacts of the relay SR. A safety-relay-holding circuit is provided, however, to maintain the relay SR energized, such circuit including conductor 260, coil of relay SR, conductors 262 and 282, a set of normally-open contacts of relay SR (adjusted to close before the set of normally-closed contacts open), conductor 284, stop switch SS, and conductor 286.

When the relay SR is thus energized and held in by its holding circuit, another set of its normally-open contacts is closed to thereby close a conveyor-motor-actuating circuit, via conductor 280, a set of normally-open but now closed contacts of relay SR, conductor 288, the coil of relay CR, and conductor 290. Thereupon, conveyor relay CR is energized and closes its contacts to start the motor CM to drive the conveyors. It will be noted that, since the relay SR is energized, its single set of normally-closed contacts is open to thereby interrupt the energizing circuit for the time-delay relays TR1 and TR2, which circuit includes conductors 280 and 278, the normally-closed contacts of relay SR, conductor 276, conductors 292 and 294, the parallel-connected coils of relays TR1 and TR2, conductor 296, and conductor 298. Energization of the relay SR also interrupts the energizing circuit of all the dump relays DR. Since the circuits for the several feeders include several sets of parallel-connected sections, one set for each feeder, a description of the circuits for one feeder, for example, F1, will suffice for all. In this manner the energizing circuit for the dump relay DR1 includes conductors 280 and 278, the normally-closed contacts of relay SR, conductor 276, the dump switch DS, conductors 300 and 302, coil of relay DR1, conductor 304, a set of normally-closed contacts of the weigh switch WS1, conductor 306, and conductor 308. Upon de-energization of the relay DR1, the dumping doors of the feeder F1 are open.

It will be noted that, prior to closing the conveyor switch CS, the energizing circuit of the time-delay relay TR1 is closed, so that the relay TR1 is energized and its contacts are closed. The contacts of relay TR1 are included in a holding circuit for the energizing relay ER1, which circuit includes conductors 310 and 312, the contacts of relay TR1, conductors 314 and 316, a set of normally-open contacts of the relay ER1, conductors 318 and 320, coil of the relay ER1, conductor 322, and conductor 324. Since the contacts of relay TR1 delay in opening, however, there is a delay in the interruption of the holding circuit for the relay ER1 after the conveyor switch CS is closed, and before this interruption the energizing circuit for the dump relay DR1 is opened, to thus close its three sets of normally-closed contacts. One set of these contacts is included in an energizing circuit for the energizing relay ER1, which circuit includes conductors 324 and 322, coil of relay ER1, conductors 320 and 318, a set of normally-closed contacts of dump relay DR1, and conductor 326. Accordingly, the energizing circuit for the energizing relay ER1 is closed when the energizing circuit for the relay DR1 is interrupted to thus maintain the relay ER1 energized.

As long as the relay ER1 is energized, it will be noted that the energizing circuit for the feeder motor relay FR1 is open, such circuit including conductors 328 and 330, coil of relay FR1, conductors 332, 334, and 336, the set of normally-closed but now open contacts of relay ER1, conductors 338 and 340, the contacts of time-delay relay TR2, conductor 312, and conductor 310. Therefore, the feeder motor relay FR1 cannot be energized to start the feeder motor FM1 until the relay ER1 has been de-energized.

The above conditions will prevail; i.e., the conveyors will run, dumping doors of the weigh pans of the several machines will be open, and the feeder F1 will not run until the holding circuit for the safety relay SR is interrupted by actuation of the stop switch SS by the lug 156 on the timing chain.

Substantially simultaneously with the interruption of the holding circuit for the relay SR, the energizing circuits for the time-delay relays TR1 and TR2 for the dump relay DR1 are closed by the de-energization of the relay SR. Energization of the relay DR1 interrupts the energizing circuit for the relay ER1 and, since the contacts of the time-delay relay TR1 also delay in closing, the holding circuit for the relay ER1 is not closed prior to its energizing circuit being opened. Hence, the relay ER1 is de-energized and closes the energizing circuit for the feeder motor relay FR1, as well as opening the energizing circuit for relay SR, so that the conveyor stops. Since the delayed-opening contacts of the relay TR2 are included in the energizing circuit for the feeder motor relay FR1, this circuit will be closed only long enough for energization of the relay FR1. Energization of this relay FR1, however, closes a holding circuit therefor which includes conductors 328 and 330, coil of relay FR1, conductors 332 and 334, a set of the normally-open but now closed contacts of the relay FR1, conductor 342, switch FS1 when in automatic position, conductor 344, a set of normally-closed contacts of switch WS1, and conductors 346, 306, and 308. Hence, the feeder F1 runs and delivers fibers to its weigh pan while the conveyors pause.

When the feeder F1 has delivered its predetermined weight of fibers into its weigh pan, the latter drops and thereby opens both sets of contacts of its weigh switch WS1 to thereby interrupt both the holding circuit for the feeder motor relay FR1 and the energizing circuit for the dump relay DR1. Accordingly, the feeder motor relay FR1 is de-energized to thereby stop the operation of the feeder motor FM1, to cease further delivery of the fibers into the weigh pan. At the same time, the de-energization of the dump relay DR1 reverses the direction of circuit flow through the electromagnet E1 and thereby dumps the fibers from the weigh pan onto the distributing conveyor DC1. At the same time, the de-energization of the relay DR1 closes the energizing circuit for the relay ER1, and the energization of relay ER1 closes the energizing circuit for the relay SR. Energization of this latter relay closes the conveyor-motor-actuating circuit and the conveyors start to run.

After the initial load from feeder F1 has thus been dumped and the conveyors start to run, the feeder control switch FS2 is moved to automatic position A, so that when the lug 156 on the timing chain again interrupts the holding circuit for the relay SR, the holding circuits for both feeder motor relays FR1 and FR2 will be closed to thereby permit both feeders F1 and F2 to operate and complete their filling, dumping, and stopping cycles. Likewise, after feeders F1 and F2 have been started, as heretofore described, feeder F3 is started in the same manner by moving its control switch FS3 to automatic position A. Thereupon, the conveyors will run a predetermined distance and stop; each feeder will independently complete its filling, dumping, and stopping cycle; and upon the stopping of the last feeder to dump, the conveyors will again be driven because of the closing of the safety-relay-energizing circuit.

At the end of a run the several feeders are stopped in the same sequence for the same reason described above with reference to the electric controls shown in FIGURE 12.

It will be seen that the feeders F will recycle automatically only when their control switches FS are in automatic position A to thereby enable the several holding circuits for the feeder motor relays FR to be completed. In the event that it is desired to weigh test any one of the feeders while the entire apparatus is shut down, the control switch FS of the desired feeder F, for example, F1, is moved to manual position M, thereby completing an alternative feeder motor relay energizing circuit, which circuit includes conductors 328 and 330, coil of relay FR1, conductors 332 and 334, switch FS1 when in M position, conductor 344, a set of normally-closed contacts of weight switch WS1, and conductors 346, 306, and 308. Of course, energization of the feeder motor relay FR1 starts feeder motor FM1, and the feeder F1 will fill its weigh pan, drop, and dump. The feeder F1 will thus continue to recycle, without operation of the conveyors, as long as the switch FS1 is in M position.

In the event it is desired to dump the weigh pan of any of the feeders being so tested before sufficient fibers have been received in the pan to cause it to drop and open the corresponding weigh switch WS, the dump switch DS is opened, thereby interrupting the dump relay energizing circuits.

It will thus be seen that the objects of this invention have been fully and effectively accomplished. The different fibers going into the final blend are fed simultaneously and at uniform rates into the beater blender. Hence, the final blend is a completely homogenized mixture of the several different fibers. The apparatus also operates at relatively high speed, in that about 330 loads or batches per hour can be discharged from each feeder. Such large capacity is due largely to the unique weighing apparatus, which, though quite sensitive to the small weights involved (a range of about 4 to 20 ounces), operates smoothly and rapidly without any hunting whatever. Moreover, the weighing apparatus is extremely accurate since the scale beam does not move until, and drops abruptly only when, the predetermined weight of fibers is received in the corresponding weigh pan and the automatic brakes on the feeder motors provide a sharp delivery cut-off. Additionally, since the vertical distance travelled by the weigh pan is quite small, upon the dumping of a load the weigh pan can be rapidly repositioned for the reception of another batch of fibers therein. In this connection it will be noted that, since the magnetic plate 108 is never completely withdrawn from the field of magnetic attraction of the permanent magnet 96, the permanent magnet quickly draws the weigh pan back into fiber-receiving position upon the dumping of a load. Further, it will be noted that, because the dumping doors of the weigh pan are forcefully flung open by reversal of the current through the electromagnet, the fibers are dumped more rapidly than would be possible by the mere unlatching of a dumping door for gravity opening thereof by a weight of fibers in the weigh pan. Additionally, the door opening and closing mechanism functions extremely smoothly and without undue jarring.

It will be realized that the specific embodiments shown and described to illustrate the principles of this invention are subject to modification without departing from such principles. Therefore, this invention includes all modifications encompassed within the spirit and scope of the following claims.

We claim:

1. Material-blending apparatus comprising: movable collecting conveyor means; automatic and continually-operating means for depositing in repetitive cycles a plurality of separate loads of different materials, each of a predetermined weight, on separate equilength sections of said conveyor means; and means correlating the operation of said depositing means with the operation of said conveyor means to cause each said load to be deposited in substantially coextensive overlying relation with a load previously deposited on a section of said conveyor means by an adjacent depositing means, said correlating means including an electric circuit and means affecting the energization of said circuit each time said conveyor means moves the same predetermined distance.

2. The structure defined in claim 1 in which the conveyor means operates continuously, the depositing means effects a simultaneous deposition of the separate loads in each cycle, and the energization-affecting means includes timing cam means operated with said conveyor means for operating the depositing means in accordance with the linear speed of said conveyor means.

3. The structure defined in claim 2 including a safety electric circuit associated with the depositing means and the conveyor means for stopping the latter in the event said depositing means fails to deposit a load of material on operation thereof by the cam means.

4. The structure defined in claim 1 in which the correlating means effects intermittent operation of the conveyor means and includes means for rendering the depositing means operative when said conveyor means is stopped and means for rendering said depositing means inoperative during movement of said conveyor means.

5. The structure defined in claim 4 including a safety electric circuit associated with the depositing means and the conveyor means for maintaining the latter stopped until the depositing means deposits all of the loads of material in any cycle.

6. The structure defined in claim 1 including a safety electric circuit associated with the depositing means and the conveyor means for preventing operation of the latter on failure of said depositing means to deposit a load of material in any cycle.

7. Material-blending apparatus comprising: a plurality of material-feeding machines, each arranged to deliver material therefrom; a plurality of equally-spaced equi-length material-receiving means, one for each of said machines and positioned to receive material delivered thereby; means operable by the weight of a predetermined load of fibers in each separate material-receiving means for stopping the delivery of material from the corresponding machine; discharge means for each of said material-receiving means; movable collecting conveyor means for receiving, on separate equi-length sections thereof, the separate loads of fibers discharged from said material-receiving means; and means correlating the operation of all of said discharge means with the operation of said conveyor means for causing automatic continual intermittent operation of each of said discharge means and for causing each such operation to deposit the resultingly discharged load of material on said conveyor means in substantially coextensive overlying relation with a load of material previously deposited on said conveyor means from an adjacent material-receiving means, said correlating means including an electric circuit and means affecting the energization of said circuit each time said conveyor means moves the same predetermined distance.

8. The structure defined in claim 7 including means interposed between each of the material-receiving means and the conveyor means for receiving each discharged load of material and uniformly distributing said load over a length of the conveyor means equal to the distance between the discharged but undistributed loads plus the length of a received but undistributed load.

9. The structure defined in claim 7 in which the ends of the conveyor means equi-length sections are substantially contiguous, and including means located between each of the material-receiving means and the conveyor means for receiving each discharged load of material and uniformly distributing said load over a said section of said conveyor means.

10. The structure defined in claim 7 including a distributing conveyor positioned between each material-receiving means and the collecting conveyor means and arranged to receive each load of fibers discharged from the said material-receiving means and separately discharge each said discharged load from one end of said distributing conveyor for direct distribution over a said section of said collecting conveyor means, the length of said distributing conveyors being substantially equal to the lengths of the separate said loads received thereon, and the length of each said load divided by the distance between the said discharge ends of said distribution conveyors being substantially equal to the linear speed of said distributing conveyors divided by the linear speed of said collecting conveyor means.

11. Fiber-blending apparatus comprising: a plurality of fiber-feeding machines, each arranged to deliver fibers therefrom; a plurality of equally-spaced fiber-receiving containers, one for each of said machines and positioned to receive fibers delivered thereby, each said container having a bottom dumping door; means operable by the weight of a predetermined load of fibers in each separate said container for stopping the delivery of fibers from the corresponding machine; means for opening each said door to dump each said load of fibers from each said container; a continuously-operating movable collecting conveyor extending beneath said containers for receiving, on equi-length sections of said conveyor, the separate loads of fibers dumped from said containers; and means correlating the operation of said door-opening means with the operation of said conveyor for causing each operation of each door-opening means to deposit the resultingly dumped load of fibers on said conveyor in substantially coextensive overlying relation with a load of fibers previously dumped on said conveyor from an adjacent container, said correlating means including an electric circuit and means affecting the energization of said circuit each time said conveyor moves the same predetermined distance.

12. Fiber-blending apparatus comprising: a plurality of fiber-feeding machines, each arranged to deliver fibers therefrom; a plurality of equally-spaced fiber-receiving means, one for each of said machines and positioned to receive fibers delivered thereby; means operable by the weight of a predetermined load of fibers in each separate fiber-receiving means for stopping the delivery of fibers from the corresponding machine; means for simultaneously discharging all said loads from all said fiber-receiving means; continuously-operating movable collecting conveyor means for receiving, on separate equi-length sections thereof, the separate loads of fibers discharged from said fiber-receiving means; and means correlated with said conveyor means for cyclically operating said discharge means to cause each of the resultingly discharged loads to be deposited on said conveyor means in substantially coextensive overlying relation with a load previously deposited on said conveyor means from an adjacent fiber-receiving means.

13. The structure defined in claim 12 including a safety electric circuit associated with said conveyor means and said discharge means for preventing operation of the latter by the correlated means and for stopping said conveyor means in the event the predetermined loads of fibers have not been received in all of the fiber-receiving means.

14. Fiber-blending apparatus comprising: a plurality of fiber-feeding machines, each arranged to deliver fibers therefrom; a plurality of equally-spaced fiber-receiving means, one for each of said machines and positioned to receive fibers delivered thereby; means operable by the weight of a predetermined load of fibers in each separate fiber-receiving means for stopping the delivery of fibers from the corresponding machine; means for simultaneously discharging all said loads from all said fiber-receiving means; continuously-operating movable collecting conveyor means for receiving, on separate equi-length sections thereof, the separate loads of fibers discharged from said fiber-receiving means; means correlated with said conveyor means for operating said discharge means to cause each of the resultingly discharged loads to be deposited on said conveyor means in substantially coextensive overlying relation with a load of fibers previously deposited on said conveyor means from an adjacent fiber-receiving means; and means automatically operable upon the discharge of said loads from said fiber-receiving means for restarting the delivery of fibers from said machines.

15. The structure defined in claim 14 in which the automatic means includes means for delaying the restarting of the delivery of fibers for a predetermined interval of time after the discharge of the loads from the fiber-receiving means.

16. Fiber-blending apparatus comprising: a plurality of fiber-feeding machines, each arranged to deliver fibers therefrom; a plurality of equally-spaced fiber-receiving means, one for each of said machines and positioned to receive fibers delivered thereby; means operable by the weight of a predetermined load of fibers in each separate fiber-receiving means for stopping the delivery of fibers from the corresponding machine; means for simultaneously discharging all said loads from all said fiber-receiving means; continuously-operating movable collecting conveyor means for receiving, on separate equi-length sections thereof, the separate loads of fibers discharged from said fiber-receiving means; means correlated with said conveyor means for operating said discharge means to cause each of the resultingly discharged loads of fibers to be deposited on said conveyor means in substantially coextensive overlying relation with a load of fibers previously deposited on said conveyor means from an adjacent fiber-receiving means; and automatic means for halting said conveyor means and preventing operation of said discharge means upon actuation of said correlated operating means before all said fiber-receiving means have had their corresponding predetermined loads delivered thereto and for operating said discharge means and restarting said conveyor means when all said fiber-receiving means have had their corresponding predetermined loads delivered thereto.

17. Fiber-blending apparatus comprising: a plurality of fiber-feeding machines, each arranged to deliver fibers therefrom; a plurality of equally-spaced fiber-receiving means, one for each of said machines and positioned to receive fibers delivered thereby; discharge means for each of said fiber-receiving means; means operable by the weight of a predetermined load of fibers in each separate fiber-receiving means for stopping the delivery of fibers from the corresponding machine and for operating the corresponding discharge means; a movable collecting conveyor for receiving, on separate equi-length sections thereof, the separate loads of fibers discharged from said fiber-receiving means; and means correlating the operation of said conveyor and the operation of said machines to automatically cause alternate operation of said conveyor and said machines to effect a delivery cycle of all of said machines and to cause each operation of each said discharge means to deposit the resultingly discharged load of fibers on said conveyor in substantially coextensive overlying relation with a load of fibers previously deposited on said conveyor from an adjacent fiber-receiving means, said correlating means including an eletric circut and means affecting the energization of said circuit each time said conveyor moves a predetermined distance and each time all of said discharge means are operated.

18. The structure defined in claim 17 including a distributing conveyor disposed between each fiber-receiving means and the collecting conveyor and operable with the latter, each said distributing conveyor being arranged to receive each load of fibers discharged from the corresponding fiber-receiving means and separately discharge each said discharged load from one end of said distributing conveyor for direct distribution over a said section of said collecting conveyor, the length of said distributing conveyors being substantially equal to the lengths of the separate said loads received thereon, and said length of each said load divided by the distance between the said discharge ends of said distributing conveyors being substantially equal to the linear speed of said distributing conveyors divided by the linear speed of said collecting conveyor.

19. Fiber-blending apparatus comprising: a plurality of fiber-feeding machines, each arranged to deliver fibers therefrom; a plurality of equally-spaced fiber-receiving means, one for each of said machines and positioned to receive fibers delivered thereby; fiber-discharging means for each of said fiber-receiving means; means operable by the weight of a predetermined load of fibers in each separate fiber-receiving means for stopping the delivery of fibers from the corresponding machine and for operating the corresponding discharging means; a movable collecting conveyor for receiving, on separate equi-length sections thereof, the separate loads of fibers discharged from said fiber-receiving means; means automatically operable on the discharge of all said loads from all said fiber-receiving means for starting said conveyor; means for stopping said conveyor after the latter has travelled a distance equal to the length of a load thereon plus the distance between adjacent loads thereon; and means for restarting the delivery of fibers from all said machines when said conveyor stops.

20. In weighing apparatus the combination comprising: a weighing scale having a load-supporting beam; a weigh pan supported on said beam, said scale being adjustable to exactly balance when said pan is empty; magnetic means secured on said beam; a magnet mounted independently of said scale in position to attract said magnetic means and urge said beam to move in a direction to cause said pan to rise; fixed abutment means engageable with said beam for maintaining the latter in its exactly balanced position against the attractive force between said magnet and said magnetic means; and means for varying said attractive force whereby a predetermined load in said pan will cause movement of said beam in the opposite direction.

21. The structure defined in claim 20 in which the means for varying the attractive force comprises means [mounted] *moving* said magnet for adjustment toward and away from the magnetic means.

22. The structure defined in claim 20 including second fixed abutment means spaced from said beam in the said balanced position thereof and enageable thereby for stopping movement of said beam in the said opposite direction to maintain the magnetic means within the effective attractive range of the magnet.

23. In weighing apparatus the combination comprising: weigh pan means; bottom dumping door means hinged to said pan means; a permanent magnet on one of said means; and a direct current electromagnet on the other of said means, one of the poles of said permanent magnet being positioned adjacent one of the poles of said electromagnet when said door means is closed, whereby, when said adjacent poles are of opposite polarity, said door means is held closed by magnetic attractive force and, when said adjacent poles are of like polarity, said door means is held open by magnetic repelling force.

24. The structure defined in claim 23 including counterbalance means on said door means for barely maintaining the latter closed in the absence of said permanent magnet.

25. The structure defined in claim 23 in which the permanent magnet is mounted on the door means and the electromagnet is mounted on the weigh pan means.

26. Material-blending apparatus comprising: a plurality of material-feeding machines, each arranged to deliver material therefrom; a plurality of equally-spaced equi-length material-receiving means spaced apart a distance substantially equal to a multiple of the length of each said means, one for each of said machines and positioned to receive material delivered thereby; means operable by the weight of a predetermined load of material in each separate said material-receiving means for stopping the delivery of material from the corresponding machine; discharge means for each of said material-receiving means; movable collecting conveyor means for directly receiving the separate loads of material discharge from said material-receiving means; and means correlating the operation of said discharge means with the operation of said conveyor means for causing each operation of each said discharge means to deposit the resultingly discharged load of material on said conveyor means in substantially coextensive overlying relation with a load of material previously deposited on said conveyor means from an adjacent material-receiving means, and for causing the ends of all the loads dumped on said conveyor means from each said material-receiving means to be substantially contiguous.

27. Fiber-blending apparatus comprising: a plurality of fiber-feeding machines, each arranged to deliver fibers therefrom; a plurality of equi-length fiber-receiving containers spaced apart a distance substantially equal to a multiple of their lengths, one for each of said machines and positioned to receive fibers delivered thereby, each said container having a bottom dumping door; means operable by the weight of a predetermined load of fibers in each separate said container for stopping the delivery of fibers from the corresponding machine; means for opening each said door to dump each said load of fibers from each said container; a movable collecting conveyor extending beneath said containers for directly receiving the separate loads of fibers dumped from said containers; and means correlating the operation of said door-opening means with the operation of said conveyor means for causing each operation of each door-opening means to deposit the resultingly dumped load of fibers on said conveyor in substantially coextensive overlying relation with a load of fibers previously dumped on said conveyor from an adjacent container, and for causing the ends of all of the loads dumped on said conveyor from each said fiber-receiving means to be substantially contiguous.

28. Fiber-blending apparatus comprising: a plurality of fiber-feeding machines, each arranged to deliver fibers therefrom; a plurality of equi-length fiber-receiving means spaced apart a distance substantially equal to a multiple of the length of each said means, one for each of said machines and positioned to receive fibers delivered thereby; means operable by the weight of a predetermined load of fibers in each separate said fiber-receiving means for stopping the delivery of fibers from the corresponding machine; means for simultaneously discharging all said loads from all said fiber-receiving means; movable collecting conveyor means for directly receiving the separate loads of fibers discharged from said fiber-receiving means; and means correlated with said conveyor means for periodically operating said discharge means when said conveyor means travels a distance substantially equal to the length of a load of fibers deposited thereon.

29. Fiber-blending apparatus comprising: a plurality of fiber-feeding machines, each arranged to deliver fibers therefrom; a plurality of equi-length fiber-receiving means spaced apart a distance substantially equal to a multiple of the length of each said means, one for each of said machines and positioned to receive fibers delivered thereby; means operable by the weight of a predetermined load of fibers in each separate said fiber-receiving means for stopping the delivery of fibers from the corresponding machine; means for simultaneously discharging all said loads from all said fiber-receiving means; movable collecting conveyor means for directly receiving the separate loads of fibers discharged from said fiber-receiving means; means correlated with said conveyor means for periodically operating said discharge means when said conveyor means travels a distance substantially equal to the length of a load of fibers deposited thereon; and means automatically operable upon the discharge of said loads from said fiber-receiving means for restarting the delivery of fibers from said machines.

30. Fiber-blending apparatus comprising: a plurality of fiber-feeding machines, each arranged to deliver fibers therefrom; a plurality of equi-length fiber-receiving means spaced apart a distance substantially equal to a multiple of the length of each said means, one for each of said machines and positioned to receive fibers delivered thereby; discharge means for each of said fiber-receiving means; means operable by the weight of a predetermined load of fibers in each separate said fiber-receiving means for stopping the delivery of fibers from the corresponding machine and for operating the corresponding discharge means; a movable collecting conveyor for directly receiving the separate loads of fibers discharged from said fiber-receiving means; and means correlating the operation of said conveyor and the operation of said machines for causing alternate operation of said conveyor and said machines and for causing said conveyor to travel a distance substantially equal to the length of a load of fibers at each operation of said conveyor.

31. Fiber-blending apparatus comprising: a plurality of fiber-feeding machines, each arranged to deliver fibers therefrom; a plurality of equi-length fiber-receiving means spaced apart a distance substantially equal to a multiple of the length of each said means, one for each of said machines and positioned to receive fibers delivered thereby; fiber-discharging means for each of said fiber-receiving means; means operable by the weight of a predetermined load of fibers in each separate said fiber-receiving means for stopping the delivery of fibers from the corresponding machine and for operating the corresponding discharging means; a movable collecting conveyor for directly receiving the separate loads of fibers discharged from said fiber-receiving means; means operable on the discharge of all said loads from all said fiber-receiving means for starting said conveyor; means for stopping said conveyor after the latter has travelled a distance substantially equal to the length of a load thereon; and means for restarting the delivery of fibers from all said machines when said conveyor stops.

32. In [weighting] *weighing* apparatus the combination comprising: a balancing scale beam; a load holder therefor; means balancing said scale when said load holder is empty; and magnetic means exerting an attractive force on said scale beam for maintaining the latter against unbalancing movement except by a predetermined weight of material in said load-holder; and means mounting said magnetic means for adjustment toward and away from said beam to vary said attractive force.

[33. Apparatus for use in proportioning different fibers to be blended comprising a plurality of machines for concurrently feeding, weighing and discharging predetermined amounts of each of a plurality of fibers in successive batches, a movable conveyor for receiving said batches, each of said machines including a fiber feeder and scale means including a receptacle disposed to receive and weigh fibers delivered by said feeder, automatic means to discharge weighed batches of fibers from the receptacles, said means including an electrical circuit cooperating with said movable conveyor and said receptacles for delivering the batches of fibers from the latter onto one another in superposed layers on the conveyor while it is moving, said conveyor serving to transport such layers and means to insure maintenance of the predetermined percentages of the several different fibers in similar successive batches, said means including an electrical circuit which is operative to de-energize the receptacle-discharging means when less than the predetermined amount of any of the several fibers has been weighed.]

34. Material-blending apparatus comprising: movable collecting conveyor means; automatic and continually-operating means for depositing in repetitive cycles a plurality of separate loads of different materials, each of a predetermined weight, on separate equi-length sections of said conveyor means; means correlating the operation of said depositing means with the operation of said conveyor means to cause each said load to be deposited in substantially coextensive overlying relation with a load previously deposited on a said section of said conveyor means by an adjacent depositing means; and a safety electric circuit associated with said depositing means and with said conveyor means for preventing operation of the latter on failure of said depositing means to deposit a load of material in any clcle.

35. Weighing apparatus comprising: a scale beam; a load holder supported thereon; a counter-weight adjustably mounted on said beam; magnetic means positioned to exert an attractive force on said beam to urge the latter to move in the same direction it is urged by said counterweight, whereby said beam will not move as a load in said holder approaches a weight sufficient to overcome the forces exerted by said counterweight and by said magnetic means but moves with a snap action when the load attains the overcoming weight; and means mounting said magnetic means for adjustment toward and away from said beam to vary said attractive force.

36. Weighing apparatus comprising: a scale beam; a load holder supported thereon; a counterweight adjustably mounted on said beam; magnetic means positioned to exert an attractive force on said beam for supplementing the counterbalancing effect of said counterweight, whereby said beam will not move as a load in said holder approaches a weight sufficient to overcome the forces exerted by said counterweight and by said magnetic means but moves with a snap action when the load attains the overcoming weight; and means mounting said magnetic means for adjustment toward and away from said beam to vary said attractive force.

37. Weighing apparatus comprising: a scale beam; a load holder supported thereon; counterbalancing means associated with said beam including an adjustable counterbalance weight and magnetic means exerting an attractive force effective on said beam; and means mounting said magnetic means for adjustment toward and away from said beam to vary said attractive force.

*38. Fiber-blending apparatus comprising: a plurality of fiber-feeding machines disposed in a row, each arranged to deliver fibers therefrom; a plurality of equi-size fiber-receiving means, one for each of said machines and positioned to receive fibers delivered thereby; means operable by the weight of a predetermined load of fibers in each separate fiber-receiving means for stopping the delivery of fibers from the corresponding machine; means for simultaneously discharging all said loads from all said fiber-receiving means; movable collecting conveyor means for directly receiving, on separate equi-length sections thereof, the separate loads of fibers discharged simultaneously from all of said fiber-receiving means; means correlated with said conveyor means for periodically operating said discharging means each time said conveyor means travels a distance equal to the length of a load of fibers received thereon, whereby the loads of fibers discharged successively from each one of said fiber-receiving means are deposited on said conveyor means in end-to-end contiguous relation and in overlying relation with the loads of fibers deposited on said conveyor means from an adjacent fiber-receiving means; means automatically operable upon the discharge of said loads from said fiber-receiving means for re-starting the delivery of fibers from said machines; and automatic means for halting said conveyor means and rendering said discharging means inoperative upon actuation of said correlated operating means at a time when any fiber-receiving means has received less than its predetermined load of fibers.*

*39. The structure defined in claim 38 in which the automatic means includes means for operating the discharging means and re-starting the conveyor means when all the fiber-receiving means have received their predetermined loads of fibers.*

*40. The structure defined in claim 38 in which the correlated means includes an electrical switch operable by cam means driven with the conveyor means.*

*41. The structure defined in claim 39 in which the automatic means includes an electrical circuit having switches therein, one associated with each fiber-receiving means and operable by receipt therein of its predetermined load of fibers.*

*42. Fiber-blending apparatus comprising: a plurality of fiber-feeding machines disposed in a row, each arranged to deliver fibers therefrom; a plurality of equi-size fiber-receiving means, one for each of said machines and positioned to receive fibers delivered thereby; means operable by the weight of a predetermined load of fibers in each separate fiber-receiving means for stopping the delivery of fibers from the corresponding machine; means for simultaneously discharging all said loads from all said fiber-receiving means; movable collecting conveyor means for directly receiving, on separate equi-size sections thereof, the separate loads of fibers discharged simultaneously from all of said fiber-receiving means; means correlated with said conveyor means for periodically operating said discharging means each time said conveyor means travels a predetermined distance to cause the loads of fibers discharged successively from each one of said fiber-receiving means to be deposited on separate contiguous sections of said conveyor means and in overlying relation with the loads of fibers deposited on said conveyor means from an adjacent fiber-receiving means; means automatically operable upon the discharge of said loads from said fiber-receiving means for re-starting the delivery of fibers from said machines; and automatic*

*means for halting said conveyor means and rendering said discharging means inoperative upon actuation of said correlated operating means at a time when any fiber-receiving means has received less than its predetermined load of fibers.*

*43. The structure defined in claim 42 in which the automatic means includes means for operating the discharging means and re-starting the conveyor means when all the fiber-receiving means have received their predetermined loads of fibers.*

*44. The structure defined in claim 42 in which the correlated means includes an electrical switch operable by cam means driven with the conveyor means.*

*45. The structure defined in claim 42 in which the automatic means includes an electrical circuit having switches therein, one associated with each fiber-receiving means and operable by receipt therein of its predetermined load of fibers.*

*46. Fiber-blending apparatus comprising: a plurality of fiber-feeding machines disposed in a row, each arranged to deliver fibers therefrom; a plurality of equi-size fiber-receiving means, one for each of said machines and positioned to receive fibers delivered thereby; fiber-discharging means for each of said fiber-receiving means; means operable by the weight of a predetermined load of fibers in each separate said fiber-receiving means for stopping the delivery of fibers from the corresponding machine and for operating the corresponding discharging means; a movable collecting conveyor for directly receiving on separate equi-length sections thereof the separate loads of fibers discharged from said fiber-receiving means; means automatically operable on the discharge of all said loads from all said fiber-receiving means for starting said conveyor; means for stopping said conveyor automatically after the latter has travelled a distance substantially equal to the length of a load of fibers thereon; and means for re-starting the delivery of fibers from all said machines automatically when said conveyor stops, whereby the loads of fibers discharged successively from each one of said fiber-receiving means are deposited on said conveyor in end-to-end contiguous relation and in overying relation with the loads of fibers deposited on said conveyor from an adjacent fiber-receiving means.*

*47. Fiber-blending apparatus comprising: a plurality of fiber-feeding machines disposed in a row, each arranged to deliver fibers therefrom; a plurality of equi-size fiber-receiving means, one for each of said machines and positioned to receive fibers delivered thereby; fiber-discharging means for each of said fiber-receiving means; means operable by the weight of a predetermined load of fibers in each separate said fiber-receiving means for stopping the delivery of fibers from the corresponding machine and for operating the corresponding discharging means; a movable collecting conveyor for directly receiving on separate equi-size sections thereof the separate loads of fibers discharged from said fiber-receiving means; means automatically operable on the discharge of all said loads from all said fiber-receiving means for starting said conveyor; means for stopping said conveyor automatically after the latter has travelled a predetermined distance; and means for re-starting the delivery of fibers from all said machines automatically when said conveyor stops, said predetermined distance being such that the loads of fibers discharged successively from each one of said fiber-receiving means are deposited on separate contiguous sections of said conveyor and in overlying relation with the loads of fibers deposited on said conveyor from an adjacent fiber-receiving means.*

References Cited in the file of this patent or the original patent

UNITED STATES PATENTS

| | | |
|---|---|---|
| 1,066,656 | Richardson | July 8, 1913 |
| 1,738,634 | Bryant | Dec. 10, 1929 |
| 1,881,060 | Okey | Oct. 4, 1932 |
| 1,929,344 | Benoit | Oct. 3, 1933 |
| 2,113,988 | Kershaw | Apr. 12, 1938 |
| 2,127,120 | Johnson et al. | Aug. 16, 1938 |
| 2,285,765 | Carswell | June 9, 1942 |
| 2,412,506 | Greene et al. | Dec. 10, 1946 |
| 2,638,305 | Miller | Apr. 4, 1949 |
| 2,650,391 | Metcalfe et al. | Sept. 1, 1953 |
| 2,703,438 | Greene et al. | Mar. 8, 1955 |

FOREIGN PATENTS

| | | |
|---|---|---|
| 914,142 | France | June 11, 1946 |